United States Patent [19]

Discount

[11] 4,071,257
[45] Jan. 31, 1978

[54] SULKY

[76] Inventor: Bernard Discount, c/o United Stellar Industries, Inc., 131 Sunnyside Blvd., Plainview, N.Y. 11803

[21] Appl. No.: 728,213

[22] Filed: Sept. 30, 1976

[51] Int. Cl.² .............................................. B62C 1/00
[52] U.S. Cl. ..................................................... 280/63
[58] Field of Search ....................... 280/63, 64, 65, 66, 280/68, 69, 70, 72, 75, 283; 403/199, 190, 191

[56] References Cited
U.S. PATENT DOCUMENTS 491,591  2/1893  Pray ........................................ 280/63
493,582  3/1893  Garrard ................................... 280/63
529,822  11/1893 Wayne ..................................... 280/63

Primary Examiner—Robert R. Song
Attorney, Agent, or Firm—Eisenman, Allsopp & Strack

[57] ABSTRACT

There is disclosed a sulky in which the coupling from the rails to the forks includes a shock-absorbing frictionally loaded lost-motion coupling which allows limited relative movement between the rails and the forks to reduce shock load transfer back and forth between the horse and the sulky, as well as reducing metal fatigue at high stress points.

7 Claims, 6 Drawing Figures

SULKY

BACKGROUND OF THE INVENTION

The design of sulkies has evolved from wooden frames to metal frames which reflect the most advanced technology of the aircraft frame industry to provide reduced weight and increased strength. The strength of a sulky frame is particularly critical because fractured parts, whether of metal or wood, can be lethal to both the horses and drivers as the fractured spars become spears. Also, because a sulky strapped to the flanks of a strong animal must absorb and comply with a spectrum of muscular and running motions as well as the jarring movements of wheels carrying the weight of a man on a dirt track, there are a myriad of interacting forces and motions in the frame which can lead to complications ranging from discomfort and fatigue to the horse, to resonances, stresses and fracturing fatigues throughout the sulky.

Accordingly, the present invention has for its object to provide an improved metal sulky design which can be light in weight and highly resistant to metal fatigue while, at the same time, affording a coupling between the horse and the loaded wheels which is sufficiently compliant to reduce the interchange of shock energy between the animal and the frame without otherwise interfering with the alignment and free-running ability of the vehicle.

THE PREFERRED EMBODIMENT

A sulky adapted to carry a driving rider behind a highly bred race horse, having one of several complex gaits, includes as its basic parts the pulling rails between which the horse is harnessed, the inverted arch to which the rails attach and which carries the rider at its top and the wheels at its depending ends and, as the critical strengthening, force-balancing, and safety shielding component, the fork assemblies associated with each wheel. The fork affords supplemental couplings from an intermediate point on the rails to a secondary coupling point on the arch and also from the same intermediate rail point to the outer ends of the axles. Lastly, it affords a vertical coupling directly from the outer ends of the axles back to the arch, with the overall strut configuration forming a protective shield between the widespread wheels of the sulky and the vulnerable flanks and legs of horses drawing nearby sulkies.

In accordance with the invention, frictionally load loss motion couplings are provided between the fork assemblies and the intermediate rail points to accommodate the differential motions which inhere in gait dynamics and muscle movement of the horse. Rates of change in tension forces which occur continuously in both rails in differing phase relation are primarily absorbed by the rugged rail-arch connection but are at the same time damped by the frictional drag of the lost-motion coupling to the arch as the fork assemblies more gradually pick up their share of the load. As a result, the highest stress point in the sulky, i.e., the intermediate rail connection, is protected against fatigue and shock while the horse is relieved of a portion of the rhythmic trauma on his body generated by the constantly changing forces and motions.

DESCRIPTION OF THE PREFERRED EMBODIMENT

Figure 1:
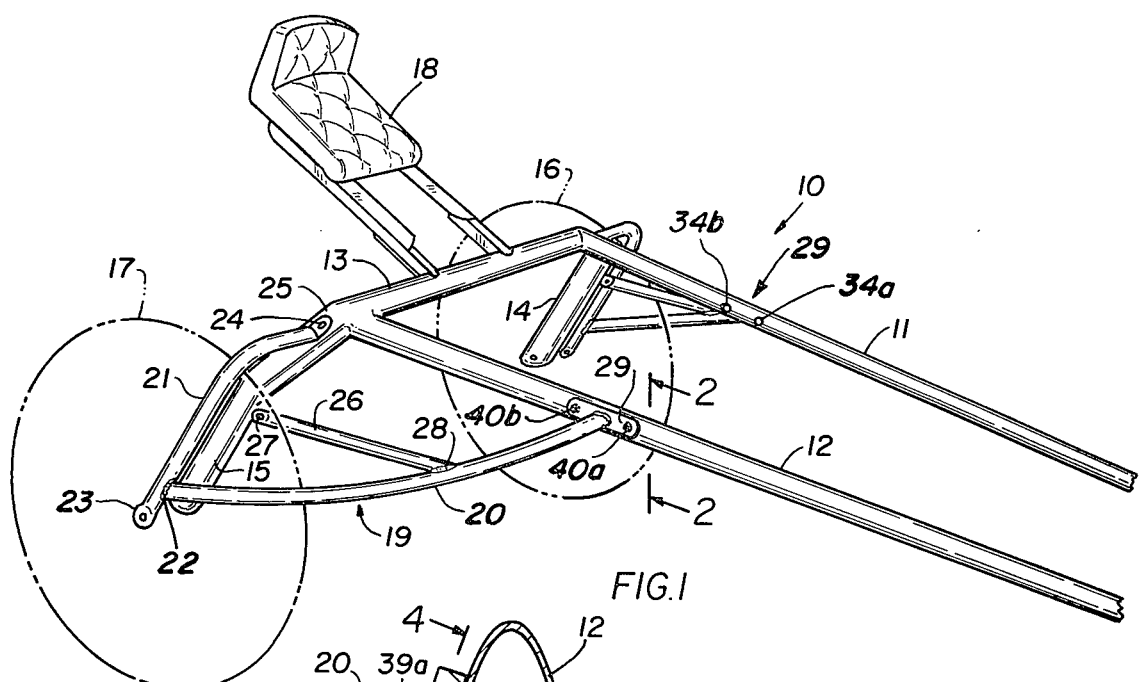
FIG. 1 is a view in perspective of a sulky embodying the present invention.

Referring to FIG. 1, the invention is illustrated as embodied in a sulky 10 having a pair of rails 11 and 12 adapted to be harnessed to the flanks of a horse using conventional harness (not shown). The rails are connected to an arch 13, the two depending ends 14 and 15 of which are connected to wheels 16 and 17 respectively. A driver's seat 18 is cantilevered rearward from the center of the arch 13 and is typically adjustable fore and aft to suit the wishes of the driver.

The most critical portion of the sulky is the fork assembly, indicated generally by the numeral 19, which in addition to coupling the rails and the arch and the wheels, affords protection to other horses laterally of the sulky. The fork 19, two of which are included in each sulky, includes a flanking strut 20 which is connected to a secondary and outer fork arm 21 in a fixed coupling 22 which can take the form, for example, of a weld. The depending end 23 of the outer fork arm 21, together with the depending end 15 of the arch 13, defines a complete fork which couples removably to the axle of the wheel which it straddles. The upper end of the outer fork arm 21 is connected in a removable coupling 24 such, for example, as a bolt, to the inclined side portion 25 of the arch. A strut 26 connects the flanking strut 20 to the depending end 15 of the arch, with the coupling 27 to the arch being separable by means, for example, as a bolt, and the coupling 28 to the flanking strut taking the form of a permanent weld.

Figure 2:
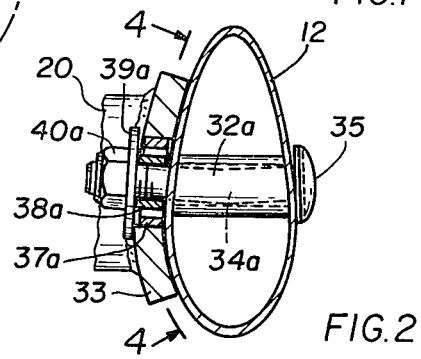
FIG. 2 is a fragmentary view in enlarged scale taken on the line 2—2 of FIG. 1 looking in the direction of the arrows.
Figure 3:
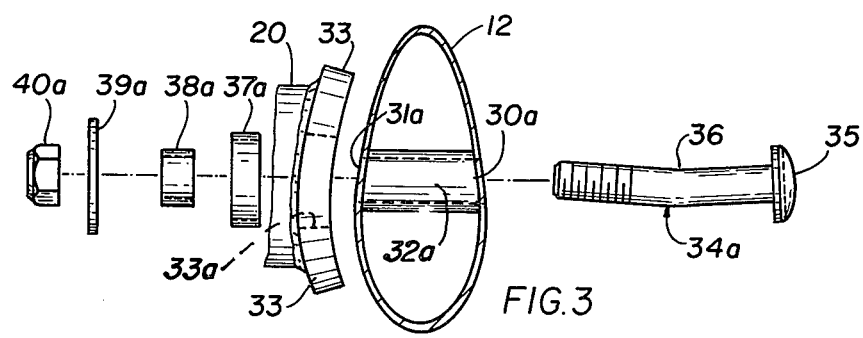
FIG. 3 is an exploded view of the subassembly shown in FIG. 2.
Figure 4:
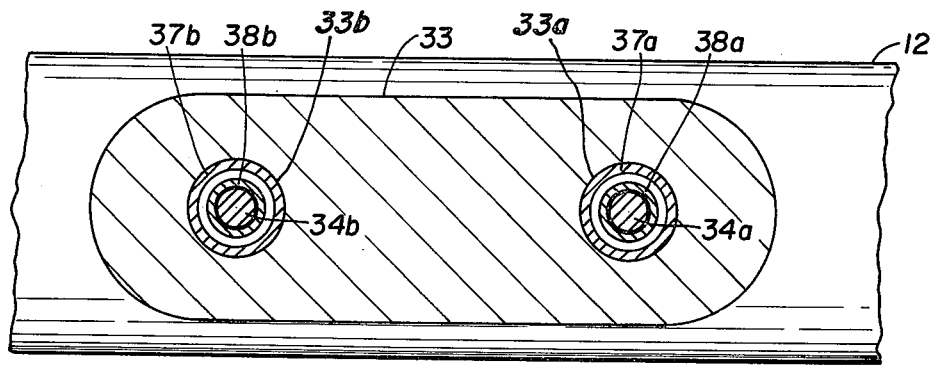
FIG. 4 is a fragmentary cross-sectional view in enlarged scale taken on the line 4—4 of FIG. 2.

The coupling of the flanking strut 20 to the rail 12 is accomplished through a removable coupling indicated generally by the numeral 29 (FIG. 1) and the details of which are shown more particularly in FIGS. 2, 3 and 4. Thus, the entire fork assembly 19, which is the most vulnerable structure in the sulky, is readily removed for repair, realignment or replacement. The hollow rails 11 and 12 and their respective couplings 29 to the flanking struts are mirror-image equivalents and, accordingly, only one coupling assembly is described in detail. The coupling 29 is joined to the rail 12 at two points spaced along the length of the rail by two substantially identical bolt assemblies, the details of one of which are shown in FIGS. 2 and 3. The rail 12 is pierced by transversely aligned holes 30a and 31a between which and within the hollow rail is fitted a compression bushing 32a.

The flanking strut 20 of the fork assembly 19 has securely welded to its forward end a contoured metal pad 33 having formed therein a pair of enlarged holes 33a and 33b (FIG. 4) normally centered with the holes in the rail respectively. Passing through the compression bushings 32a and through the enlarged holes 33a and 33b in the contoured pad 33 are a pair of shaped bolts 34a and 34b, each having a contoured head 35 to match the shape of the rail 12 and a bent shank 36 to accommodate the lack of perpendicularity between the axis of the bushing and the plane of the side of the rail 12. Fitted in the holes 33a and 33b are a first pair of wear bushings 37a and 37b which snugly engage the walls thereof, and the inside diameter of which is substantially larger than the outside diameter of the bolts 34a and 34b. A second set of wear bushings 38a and 38b receive the bolt in a snug, sliding fit with the bushings 38a and 38b having an outside diameter approximately ⅛ inch less than the inside diameters of the bushings 37a and 37b, as best seen in FIG. 4, to provide free motion. Washers 39a and 39b and lock nuts 40a and 40b complete the assembly. The interface between the pad 33 and the rail 12 is preferably coated with a dry film lubricant.

The nuts 40a and 40b are turned up sufficiently tight to establish a frictionally loaded lost-motion coupling between the pad 33 and the rail of sufficient strength to hold the parts in place except when the substantial forces of an operating sulky are imparted, at which time relative motion can take place free of resilient reactive forces. The action of the coupling under the stresses of a pulling horse and a loaded sulky is such that an orbital motion of the pad can take place around the axis of the bolts 34a and 34b. This motion precedes to a certain extent and therefore reduces the extreme flexing action which occurs in the rails and other frame parts as the sulky is operated at high speeds and, in this fashion, there is introduced a freedom of movement which serves both to relieve shock and to dampen vibration.

Figure 5:
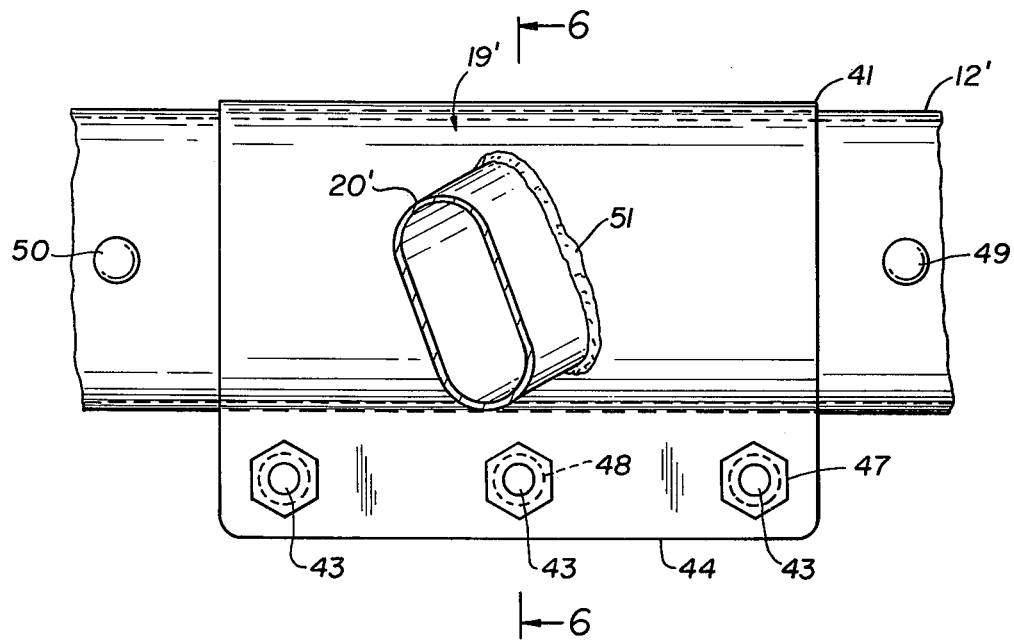
FIG. 5 is a fragmentary view in enlarged scale of a modification of the invention.
Figure 6:
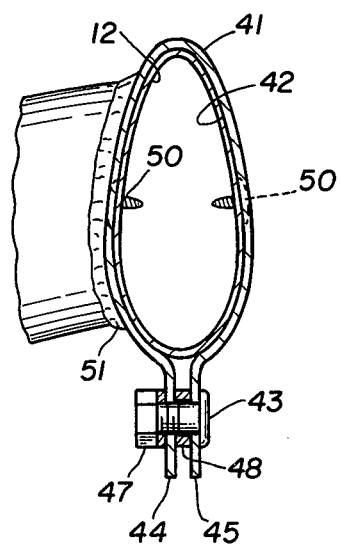
FIG. 6 is a view in cross-section taken on the line 6—6 of FIG. 5 looking in the direction of the arrows.

Referring to FIGS. 5 and 6, a modification of the invention is illustrated in which like parts to those of FIGS. 1-4 are identified by like primed reference numerals and in which the frictionally loaded shock-absorbing lost-motion coupling between the rails 11' and 12' and the fork assembly 19' and, more particularly, the flanking strut 20' thereof, affords movement longitudinally of the rails without freedom of vertical movement. Fitted over the rail is a floating collar 41, the inside surface 42 of which conforms closely to the geometry of the outside surface of the rail. The collar is secured in place by a series of three bolt assemblies 43 bridging depending flanges 44 and 45 of the collar. The bolt assemblies 43 each include, in addition to a bolt 46 and a lock nut 47, a spacer 48 fitted between the flanges 44 and 45 and through which the bolt shank passes, to establish the gripping force of the collar on the rail. The inner face between the collar and the rail is preferably coated with a dry film lubricant. Both fore and aft of the collar 41, stop pins or screws 49 and 50 respectively, preferably of case-hardened material, extend from both sides of the rail with each pin thus defining two stop surfaces for the proximate edge of the slidable collar. The flanking strut 20' is contoured at its forward end to match the contour of the side of the floating collar 41 and the two are joined by a stress-relieved weld 51.

In operation, the two collars on the two rails are free to move fore and aft independently of one another in response to changes in tension forces imparted to the rails by the striding horse. In this fashion, there is provided limited frictionally loaded lost motion which absorbs substantial amounts of shock normally transferred back and forth between the sulky and the striding horse. The flanking strut 20' and the critical weld 51 are, therefore, relieved of fatiguing stresses. It will be understood that the action of the collars will differ somewhat depending upon gait of the horse and its size and muscle action. Trotting and pacing horses typically draw sulkies, the former always moving diagonally opposite feet in synchronism and the latter always moving feet on the same side in synchronism, one pair moving forward and the other pair moving backward at any given moment. The lost-motion coupling of the modification of FIGS. 5 and 6 is limited to axial movement along the rail, whereas the arrangement of FIGS. 1-4 affords limited motion both vertically and longitudinally which can translate into elliptical movement.

Sulkies so equipped have been operated for longer periods of time with no evidence of fatigue, particularly in the critical welds 41 or 51 which couple the flanking struts 20 or 20' to the rails.

While the invention has been described above having reference to one preferred embodiment thereof, it will be understood that it can take other forms and arrangements within the scope of the invention which should not, therefore, be regarded as limited except as defined by the following claims:

I claim:

1. A sulky for carrying a rider behind a horse comprising a frame, a pair of wheels, a fork assembly for each wheel coupling the wheel to the frame, and a pair of substantially horizontal rails connected both to the frame and respective fork assemblies and adapted to embrace the flanks of the horse, the connection between the respective rails and fork assemblies including a frictionally loaded lost-motion coupling having means to stop the relative motion at predetermined distances to define the limits of the frictionally loaded lost motion.

2. A sulky as set forth in claim 1, said lost-motion coupling having limited freedom of movement axially with respect to the rail.

3. A sulky as set forth in claim 1, said lost-motion coupling having limited freedom of movement both axially and vertically with respect to the rail.

4. A sulky as set forth in claim 1, said lost-motion coupling comprising a pad contoured to frictionally engage the side of the rail, and means to couple the pad to the rail including means forming a transverse aperture through the rail and a tension member passing through the aperture with clearance and coupled at one end to the inside of the rail and coupled at the other end to the outer side of the pad with clearance to afford limited movement of the pad on the rail along two subordinate axes.

5. A sulky as set forth in claim 4, said fork including a flanking strut connected at one end to a point adjacent the wheel axle and coupled rigidly at its other end to the pad intermediate its ends, and a pair of tension members frictionally coupling the pad to the rail disposed respectively forwardly and rearwardly of the point of connection between the pad and the flanking strut.

6. A sulky as set forth in claim 4, including a pair of concentric bushings fitted in the aperture in the rail, the outer bushing being fitted snugly in the aperture and the inner bushing fitting snugly around the tension member, the inside diameter of the outer bushing and the outside diameter of the inner bushing having clearance to afford limited relative movement of the pad on the rail.

7. A sulky as set forth in claim 1, said lost-motion coupling including a sleeve enveloping the rail in frictional contact therewith for axial sliding movement therealong, adjustable means to vary the frictional clamping force and stop means to define the limits of amplitude of sliding movement, the fork assembly including a strut flanking the wheel at one end and rigidly coupled to the slide collar at the other end.

* * * * *